United States Patent Office 3,374,985
Patented Mar. 26, 1968

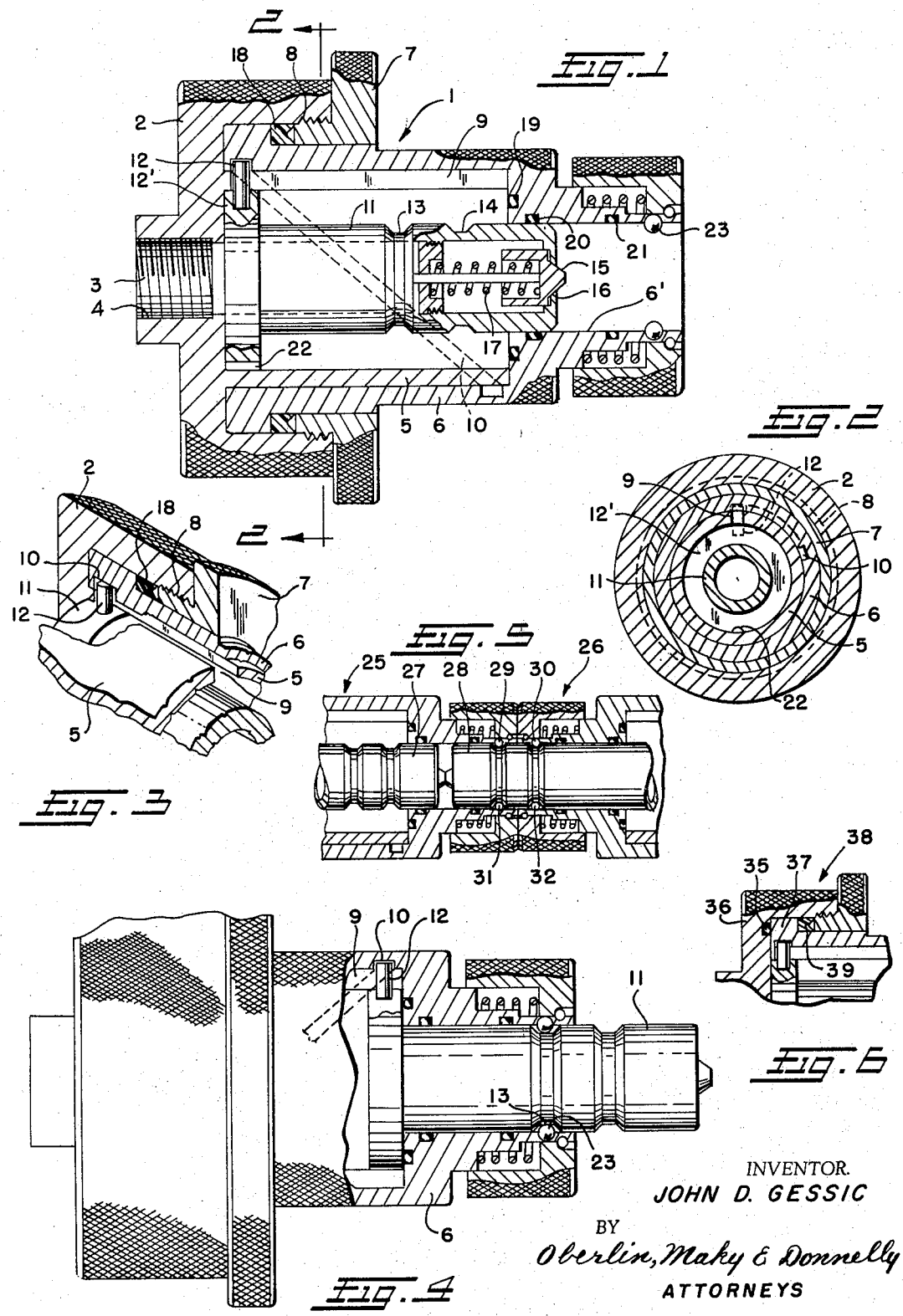

1

3,374,985
COUPLING DEVICE FOR PIPES, CONDUITS
AND THE LIKE
John D. Gessic, Chardon, Ohio, assignor of one-half
to Cullen B. Crawford, Cleveland, Ohio
Filed Oct. 22, 1965, Ser. No. 500,859
11 Claims. (Cl. 251—252)

This invention relates generally as indicated to a coupling device for pipes, conduits and the like and more particularly to such a coupling containing a movable valve unit and which is capable of being used as either a male or female unit.

Pipe couplings are, of course, used in many and varied operations wherever it is necessary to couple adjoining pipes or conduits or other members of a fluid system. In many such operations, the coupling includes a valve for control of the flow of fluid therethrough, and it is likewise common to utilize a pair of couplings with mating male and female valve units to provide for flow of fluid in either direction as desired. One disadvantage of such coupling devices is that heretofore different types of couplings have had to be used to provide the male and female units which in turn necessitates storage of the different couplings to insure that the proper coupling is available when needed.

It is accordingly an object of this invention to provide a coupling for use with pipes, conduits and the like which is capable of being used as both a male and female unit.

Another object of this invention is the provision of a coupling which may be coupled to itself in a simple and efficient manner.

It is an additional object of this invention to provide a unique coupling which is capable of being used in conjunction with a second coupling of identical design or alternatively of being used as a coupling itself.

Other objects, features and advantages of this invention will be apparent to those skilled in the art after a reading of the following more detailed description.

To the accomplishment of the foregoing and related ends, the invention, then, comprises the features hereinafter fully described and particularly pointed out in the claims, the following description and the annexed drawings setting forth in detail certain illustrative embodiments of the invention, these being indicatve, however, of but a few of the various ways in which the principle of the invention may be employed.

In said annexed drawing:

FIG. 1 is a plan view in section illustrating the coupling of this invention with the valve in the female position;

FIG. 2 is a section view taken on line 2—2 of FIG. 1 on a reduced scale;

FIG. 3 is an enlarged fragmentary perspective of the slot and groove arrangement;

FIG. 4 is a plan view in section illustrating the valve in the male positions;

FIG. 5 is a composite view showing the two couplings coupled together; and

FIG. 6 is a fragmentary section view illustrating an alternative sealing arrangement.

Referring now to the drawing and more particularly to FIGS. 1–3 inclusive, the coupling device is illustrated generally by the numeral 1 and comprises an end cap 2 which has a substantially central opening or bore 3 extending therethrough. This opening is threaded as at 4 for engagement of the coupling with an adjoining pipe or conduit or other member of a fluid system. The end cap is designed such that a portion thereof shown by numeral 5 extends longitudinally thereof generally concentrically with the central opening. A valve body 6 is positioned adjacent the end cap and surrounds the extended portion 5 of the end cap and also has a substantially central opening 6' therein in alignment with the opening in the end cap. The valve body is adapted to be rotated relative to the end cap, as will be explained in more detail. A sealing ring 7 surrounds the valve body and secures the body to the end cap, preferably by a threaded interconnection shown at 8.

The longitudinally extending portion 5 of the end cap 2 has a slot therein 9, and the valve body 6 has a spiral groove 10 therein. A valve 11 is positioned within the valve body and has means thereon 12 in the form of a pin on annular flange 12' which is engaged in longitudinally extending slot 9 and also in spiral groove 10 of the valve body 6. The valve is preferably of the type having a pair of annular grooves 13 and 14 about its outer circumference for a purpose to be explained. The valve also, of course, includes a valve stem 15 which is held in engagement with valve seat 16 by spring 17 in the standard fashion.

The coupling also preferably has an annular sealing gasket 18 positioned adjacent the sealing ring between the end cap and the valve body to prevent the leakage of fluid. Such sealing gasket may be in the form of an X or quad seal, or alternatively the standard O-ring type seal may be used. The coupling also has O-ring seals 19, 20 and 21, and a weep hole 22 is provided for fluid transfer when the valve is in motion. A plurality of locking balls 23 are positioned around the interior of the substantially central opening of the valve body to lock the valve unit in the male position.

As illustrated in FIG. 1, the valve unit of the coupling is in the female position, with the pin 12 positioned in longitudinally extending slot 9 and in spiral groove 10 at the extreme lefthand side of the coupling. Also as shown in this view, the sealing ring 7 is in firm engagement with the end cap. To transform the coupling from one with the valve in the female position to one with the valve in the male position, it is only necessary to loosen slightly the sealing ring and to hold the end cap and turn the valve body 6 in a clockwise direction. This causes the spiral groove in the valve body to move over the slot in the end cap and thus propel the valve forward through pin 12 which is attached thereto, as the pin thus moves through the longitudinal slot and contacts the turning spiral groove to propel the valve forward. When the valve has been moved as far as possible, it will be in the male position shown in FIG. 4 and will be retained in this position by engagement between the locking balls 23 and annular groove 13 of the valve. As shown in FIG. 4, the pin 12 on the valve will be at the righthand side of the slot 9 and spiral groove 10.

To move the valve from the male to the female position, the previously described procedure is simply reversed, that is the valve body is turned counterclockwise while holding the end cap, which causes the pin on the valve to ride in the longitudinal slot and spiral groove in the opposite direction and thus move the valve within the valve body. When the valve is in firm engagement with the end cap, the sealing ring is then tightened.

Referring now particularly to FIG. 5, the coupling is shown coupled to itself, that is two couplings 25 and 26 are illustrated coupled together with coupling 25 having valve 27 in the female position and coupling 26 having valve 28 in the male position. As thus shown, the two valves are in end-to-end engagement and are retained in such position by locking balls 29 and 30 positioned in annular grooves 31 and 32 of valve 28 in the male position. The two couplings may be uncoupled simply by applying a pulling force to either coupling, while maintaining the other stationary, sufficient to overcome the locking force exerted by locking balls 29 and 30 in grooves 31 and 32.

In FIG. 6, an alternative sealing arrangement is illustrated in which an O-ring seal 35 is shown as being positioned between end cap 36 and valve body 37 of coupling 38. This seal may be used with an X or quad ring 39 as shown, or alternatively it may be used without such sealing means. The coupling of this embodiment is otherwise the same as that previously described, and hence will not be further described.

Although the coupling has been described thus far as being coupled to a second coupling of identical design, it will be appreciated that the coupling may be used by itself to couple adjoining members. In such cases, the connection between the coupling and the pipe, conduit, etc. adjacent the valve tip could be by the provision of threads in the opening of the valve body or by means of the locking balls as illustrated, so long as the piece to be inserted has an annular groove therein.

Other modes of applying the principle of the invention may be employed, change being made as regards the details described, provided the features stated in any of the following claims, or the equivalent of such, be employed.

I therefore particularly point out and distinctly claim as my invention:

1. A coupling device for pipes, conduits and the like comprising an end cap having a substantially central opening extending therethrough, a valve body positioned adjacent said end cap and having a substantially central opening extending therethrough in substantial alignment with said opening in said end cap, a sealing ring surrounding said valve body and securing said body to said end cap, a longitudinally extending slot in said end cap, a spiral groove in said valve body, a valve positioned in said valve body adapted to be moved longitudinally therein, and means on said valve in engagement with said slot and said spiral groove, said means being retained in engagement with said slot and groove as said valve is moved longitudinally in said valve body.

2. The coupling device of claim 1 in which an annular sealing gasket is positioned adjacent said sealing ring between said valve body and said end cap.

3. The coupling device of claim 1 in which annular sealing means are positioned between said end cap and said valve body.

4. The coupling device of claim 1 in which said valve has a plurality of grooves about its outer circumference.

5. The coupling device of claim 1 in which a plurality of locking means are positioned circumferentially of the interior of said valve body surrounding said substantially central opening.

6. The coupling device of claim 1 in which the opening in said end cap is threaded for engagement of said coupling with an adjoining member.

7. A pipe coupling comprising an end cap having a substantially central opening extending therethrough, a valve body positioned adjacent to and surrounding a portion of said end cap, said body having a substantially central opening extending therethrough in alignment with said opening in said end cap, a sealing ring surrounding said valve body and securing said body to said end cap, a longitudinally extending slot in said end cap, a spiral groove in said valve body, a valve positioned in said valve body adapted to be moved longitudinally therein, said valve including two annular grooves about the outer circumference thereof, and means on said valve in engagement with said slot and said spiral groove, said means being retained in engagement with said slot and said groove as said valve is moved longitudinally in said valve body, and a plurality of locking means positioned circumferentially of the interior of said valve body surrounding said substantially central opening.

8. The pipe coupling of claim 7 in which a sealing gasket is provided adjacent said sealing ring between said valve body and said end cap.

9. The pipe coupling of claim 7 in which annular sealing means are provided between said end cap and said valve body.

10. A coupling device for pipes, conduits and the like comprising an end cap member having a substantially central opening extending therethrough, a valve body member positioned adjacent said end cap and having a substantially central opening extending therethrough in substantial alignment with said opening in said end cap member, a sealing ring surrounding said valve body member and securing said body to said end cap, a longitudinally extending slot in one of said members, a spiral groove in the other of said members, a valve positioned in said valve body member adapted to be moved longitudinally therein, and means on said valve in engagement with said slot and said spiral groove, said means being retained in engagement with said slot and groove as said valve is moved longitudinally in said coupling device.

11. The coupling device of claim 10 in which said longitudinally extending slot is in said end cap member and said spiral groove is in said valve body member.

References Cited

UNITED STATES PATENTS 1,603,752  10/1926  Ellis _____ 251—149.8

WILLIAM F. O'DEA, *Primary Examiner.*

H. COHN, *Assistant Examiner.*